US007039002B2

(12) United States Patent
Heo et al.

(10) Patent No.: US 7,039,002 B2
(45) Date of Patent: May 2, 2006

(54) APPARATUS AND METHOD FOR TRANSMITTING PACKET DATA USING WALSH CODES IN A MOBILE COMMUNICATION SYSTEM

(75) Inventors: Jin-Woo Heo, Seongnam-shi (KR); Sang-Min Bae, Suwon-shi (KR); Seong-Woo Ahn, Yongin-shi (KR); Jong-Han Kim, Yongin-shi (KR)

(73) Assignee: Samsung Electronics Co., Ltd., (KR)

( * ) Notice: Subject to any disclaimer, the term of this patent is extended or adjusted under 35 U.S.C. 154(b) by 972 days.

(21) Appl. No.: 10/052,982

(22) Filed: Jan. 17, 2002

(65) Prior Publication Data

US 2003/0035367 A1    Feb. 20, 2003

(30) Foreign Application Priority Data

Jan. 17, 2001    (KR)    ..................... 10-2001-0002559

(51) Int. Cl.
    *H04J 11/00*    (2006.01)
(52) U.S. Cl. ...................................... 370/208; 370/328
(58) Field of Classification Search ................ 370/208, 370/209, 252, 278, 335, 342, 441; 375/140, 375/146
    See application file for complete search history.

(56) References Cited

U.S. PATENT DOCUMENTS

| | | | |
|---|---|---|---|
| 6,147,964 A * | 11/2000 | Black et al. ................ | 370/209 |
| 6,700,881 B1 * | 3/2004 | Kong et al. .................. | 370/335 |
| 6,850,499 B1 * | 2/2005 | Wheatley et al. ............ | 370/328 |
| 6,930,981 B1 * | 8/2005 | Gopalakrishnan et al. ... | 370/252 |
| 6,934,317 B1 * | 8/2005 | Dent .......................... | 375/140 |
| 2002/0012332 A1 * | 1/2002 | Tiedemann et al. ......... | 370/335 |
| 2002/0089950 A1 * | 7/2002 | Sourour et al. ............. | 370/335 |
| 2002/0097697 A1 * | 7/2002 | Bae et al. .................... | 370/335 |
| 2005/0094604 A1 * | 5/2005 | Ozluturk et al. ............ | 370/335 |

OTHER PUBLICATIONS

Chan, M.C.-C.; Chuang, J.C.-I.; Multicode high-speed transmission with interference cancellation for wireless personal communications;Vehicular Technology Conference, 1996, IEEE 46th, vol. 2, Apr. 28-May 1, 1996 pp.: 661-665 vol. 2.*

* cited by examiner

*Primary Examiner*—Chieh M. Fan
*Assistant Examiner*—Hao Xuan Nguyen
(74) *Attorney, Agent, or Firm*—Dilworth & Barrese LLP

(57) ABSTRACT

There is provided an apparatus and method for using QOF (Quasi-Orthogonal Function) Walsh codes when enough orthogonal Walsh codes are not available for a packet data service in a mobile communication system supporting concurrent provision of a high rate packet data service and a circuit call service. A data rate (DR1) in the case of using available orthogonal Walsh codes is first obtained. Then, a data rate (DR2) in the case of using QOF Walsh codes is obtained considering a power reduction factor due to the increase of interference involved with the use of the QOF Walsh codes. Packet data is transmitted at a higher data rate of DR1 and DR2. At the same time, information about the selected data rate and information about whether the QOF Walsh codes are used or not are transmitted.

14 Claims, 4 Drawing Sheets

APPARATUS AND METHOD FOR TRANSMITTING PACKET DATA USING WALSH CODES IN A MOBILE COMMUNICATION SYSTEM

PRIORITY

This application claims priority to an application entitled "Apparatus and Method for Transmitting Packet Data Using Walsh Codes in a Mobile Communication System" filed in the Korean Industrial Property Office on Jan. 17, 2001 and assigned Serial No. 2001-2559, the contents of which are hereby incorporated by reference.

BACKGROUND OF THE INVENTION

1. Field of the Invention

The present invention relates generally to a data transmitting apparatus and method in a mobile communication system, and in particular, to an apparatus and method for transmitting packet data using Walsh codes in a mobile communication system that supports concurrent transmission of high rate packet data and voice data.

2. Description of the Related Art

Along with the rapid development of mobile technology, mobile communication systems have been developed to additionally provide data service including video conferencing and Internet browsing as well as existing voice service. In a mobile communication system supporting concurrent provision of voice service and data service, the voice service is provided on circuit channels and the data service, on packet channels for efficient data transmission.

Such a system separately uses channel power and orthogonal Walsh codes for the packet data service and the circuit data service (or circuit call service), i.e., the voice service. When the packet data service and the circuit call service are supported at the same time, the latter has priority over the former in using power and orthogonal Walsh codes. Accordingly, power and the numbers of orthogonal Walsh codes assigned to the packet data service and the circuit call service vary with time because of limited power and orthogonal Walsh codes available to a base station. That is, after power and orthogonal Walsh codes are assigned first to the circuit call service, the remaining power and orthogonal Walsh codes are available to the packet data service. As more orthogonal Walsh codes are assigned to the circuit call service, less orthogonal Walsh codes are available to the packet data service. Thus, even if high power can be assigned to the packet data service, shortage of orthogonal Walsh codes may limit the number of modulation symbols transmittable per unit time for the packet data service, thereby decreasing the packet data rate. From the perspective of the capacity of a base station, it is necessary to increase the number of Walsh codes to avoid the case that data cannot be transmitted at a high rate or the case that data transmission is impossible due to shortage of orthogonal Walsh codes, despite enough power.

Therefore, there is a need for a method and apparatus for providing a packet data service using other Walsh codes as well as orthogonal Walsh codes in a forward link transmission system.

SUMMARY OF THE INVENTION

It is, therefore, an object of the present invention to provide an apparatus and method for transmitting a large amount of packet data within a power range available to a base station in a system supporting concurrent provision of a packet data service and a voice service.

It is another object of the present invention to provide an apparatus and method for providing a packet data service using quasi-orthogonal function (QOF) Walsh codes as well as orthogonal Walsh codes in a system supporting concurrent provision of a packet data service and a voice service.

The foregoing and other objects of the present invention are achieved by providing apparatus and method for using QOF Walsh codes when enough orthogonal Walsh codes are not available for a packet data service in a mobile communication system supporting concurrent provision of a high rate packet data service and a circuit call service. A data rate (DR1) in the case of using available orthogonal Walsh codes is first obtained. Then, a data rate (DR2) in the case of using QOF Walsh codes is obtained considering a power reduction factor due to the increase of interference involved with the use of the QOF Walsh codes. Packet data is transmitted at a higher data rate of DR1 and DR2. At the same time, information about the selected data rate and information about whether the QOF Walsh codes are used or not are transmitted.

When the above method is implemented in a base station, the base station includes an orthogonal Walsh space information generator, a C/I (carrier/interference ratio) acquirer, a DR1 determiner, a DR2 determiner, a power reduction factor calculator, a data rate selector, and an information transmitter.

When the above method is implemented in a mobile station, the mobile station includes an orthogonal Walsh space information receiver, a C/I measurer, a DR1 determiner, a DR2 determiner, a power reduction factor calculator, a data rate selector, and an information transmitter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
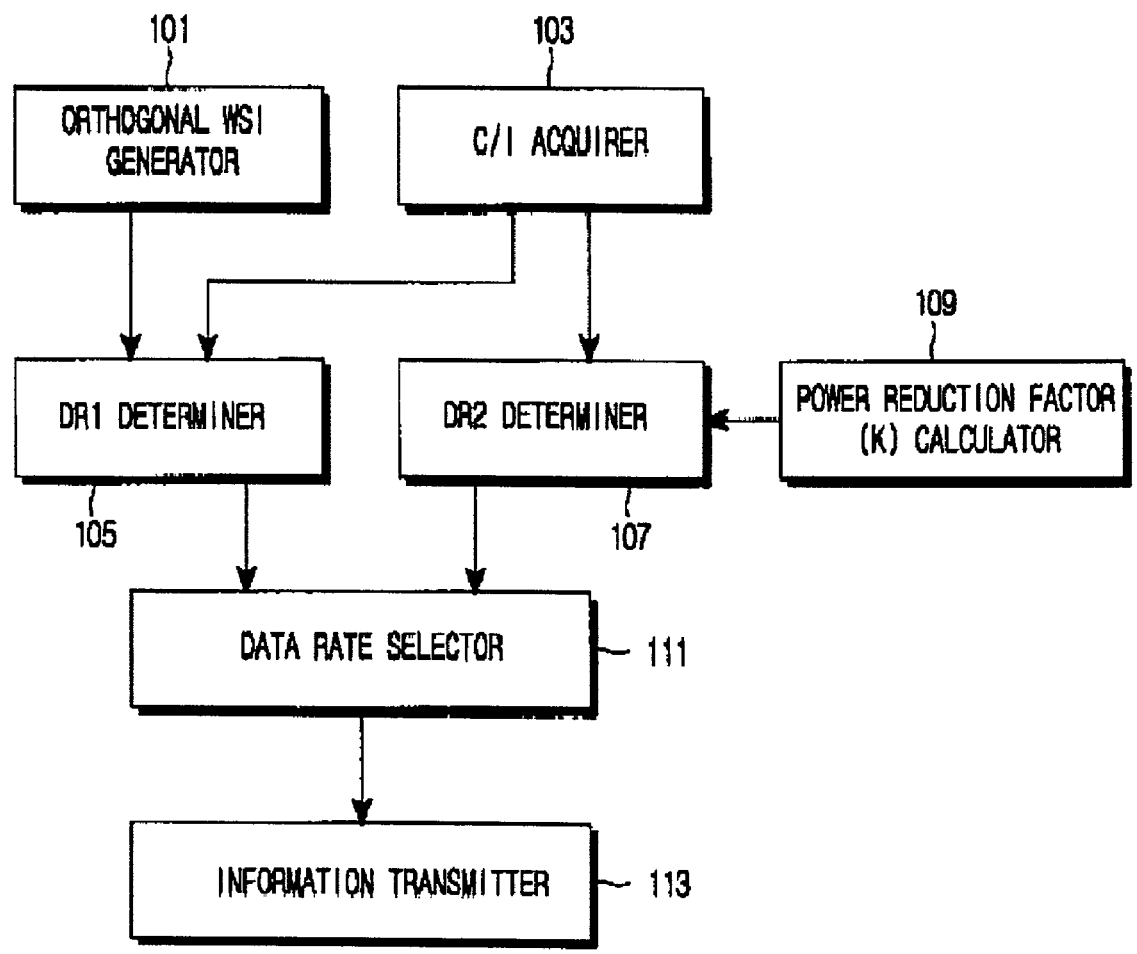
FIG. 1 is a block diagram of a base station for determining a data rate and a transmission method for a packet data service according to a preferred embodiment of the present invention.

Preferred embodiments of the present invention will be described hereinbelow with reference to the accompanying drawings. In the following description, well-known functions or constructions are not described in detail since they would obscure the invention in unnecessary detail.

The present invention is applied to a system supporting a circuit call service and a packet data service simultaneously. In general, when both services are to be provided at the same time, the circuit call service has priority over the packet data service in resources assignment. In a mobile communication system, a base station first assigns power and orthogonal Walsh codes to a mobile station that wants the circuit call service. The base station then serves a mobile station that wants the packet data service using the remaining power and orthogonal Walsh codes. The number of orthogonal Walsh codes used for the circuit call service varies as services are assigned and released. When the circuit call service is assigned, power used to maintain its QoS (Quality of Service) at a predetermined level varies on a predetermined unit time basis. In other words, both power and the number of orthogonal Walsh codes available to the packet data service vary with time. The same applies to the present invention.

In order to provide a packet data service efficiently using limited resources, the mobile radio channel state of a mobile station receiving packet data is measured and a data transmission method is chosen according to the channel state. The data rate and transmission method of packet data transmitted from the base station to the mobile station depend on the measured channel state of the mobile station, power available to the packet data service, and the number of orthogonal Walsh codes in use for other mobile stations (i.e., the number of the remaining orthogonal Walsh codes).

Table 1 below lists transmission methods and data rates available to the base station. The base station transmits packet data at one of the data rates shown in Table 1. Then, the mobile station measures the carrier-to-interference ratio (C/I) of the packet data received on a radio channel and reports the measurement to the base station. The base station then determines a data transmission method and a data rate based on the channel state information.

bits, is coded with a code rate of ⅔, and is modulated in 16QAM (Quadrature Amplitude Modulation). Then, the packet is transmitted in predetermined slots according to the state of its orthogonal Walsh code assignment. If all orthogonal Walsh codes are available to the packet data service, the packet is transmitted in one transmission slot is used at a data rate of 2,457.6 kbps.

A data rate info symbol determiner chooses one of the data rate info symbols representing 13 data transmission methods and 13 data rates shown in Table 1 based on the C/I of a received signal measured by the mobile station and power assigned to a packet. According to the chosen data rate info symbol, packet data is transmitted. If reception power measured in the mobile station is equal to the power assigned to the packet data service, the base station can use a C/I corresponding to the assigned power instead of the measured C/I. On the other hand, if the measured reception power is different from the power assigned to the packet data service, the base station transmits data according to the measured C/I information at one of the data rates shown in Table 1 for power available to the packet data service. Similarly in both cases, a data rate info symbol is determined based on the C/I of a received signal measured by the mobile station, to which power is assigned for the packet data service. Therefore, when the measured C/I is very low, a transmission method corresponding to a low data rate is chosen. If the measured C/I is very high, a transmission method corresponding to a high data rate up to 2,457.6 kbps is chosen. That is, a data rate varies with channel state.

As a circuit call service occupies more orthogonal Walsh codes, less orthogonal Walsh codes are available to a packet data service and thus less modulation symbols are transmittable in given slots on the forward link. To transmit all transmission data, an increased number of slots are used for packet transmission. As a result, the real data rate is low as

TABLE 1

| Data Rate Info Symbol | Number of Uncoded Bits | Code Rate | Modulation Type | Number of Modulation Symbols Transmitted | Minimum Number of Modulation Symbols Generated | Slots/ Physical Layer Packet | Data Rate(Kbps) when Walsh code space is fully available |
|---|---|---|---|---|---|---|---|
| 0000 | 768 | 1/6 | QPSK | 2304 | 34944 | 32 | 19.2 |
| 0001 | 768 | 1/6 | QPSK | 2304 | 17024 | 16 | 38.4 |
| 0010 | 768 | 1/6 | QPSK | 2304 | 8512 | 8 | 76.8 |
| 0011 | 768 | 1/6 | QPSK | 2304 | 4256 | 4 | 153.6 |
| 0100 | 768 | 1/6 | QPSK | 2304 | 2128 | 2 | 307.2 |
| 0101 | 768 | 1/3 | QPSK | 1152 | 1064 | 1 | 614.4 |
| 0110 | 1536 | 1/3 | QPSK | 2304 | 4368 | 4 | 307.2 |
| 0111 | 1536 | 1/3 | QPSK | 2304 | 2184 | 2 | 614.4 |
| 1000 | 1536 | 2/3 | QPSK | 1152 | 1064 | 1 | 1,228.8 |
| 1001 | 2304 | 1/3 | 8PSK | 2304 | 2184 | 2 | 921.6 |
| 1010 | 2304 | 2/3 | 8PSK | 1152 | 1064 | 1 | 1,843.2 |
| 1011 | 3072 | 1/3 | 16QAM | 2304 | 2184 | 2 | 1,228.8 |
| 1100 | 3072 | 2/3 | 16QAM | 1152 | 1064 | 1 | 2,457.6 |

Table 1 shows 13 different data transmission methods according to the reception C/I of the mobile station. For example, if a data rate info symbol is "0000", a packet has 768 uncoded bits, is encoded with a code rate of ⅙, and is modulated in QPSK (Quadrature Phase Shift Keying). Then, the packet is transmitted in predetermined slots according to the state of its orthogonal Walsh code assignment. If all orthogonal Walsh codes are available to the packet data service, the packet is transmitted in 32 transmission slots at a data rate of 19.2 kbps. To take another example, if the data rate info symbol is "1100", the packet has 3072 uncoded compared with the case where all orthogonal Walsh codes are used for the packet data service. If an n-bit packet is transmitted in m 1.25 msec-slots, the data rate is n/(m×1.25 msec) bps. As the number of slots, m, increases, the data rate for the n-bit packet decreases.

Therefore, when a small number of orthogonal Walsh codes are available to the packet data service, a data rate in the case of using the orthogonal Walsh codes is compared with a data rate in the case of using QOF Walsh codes and the Walsh codes, either orthogonal or QOF, offering a higher data rate is chosen for the packet data service.

FIG. 1 is a block diagram of a base station for determining a data rate and a transmission method for a packet data service according to a preferred embodiment of the present invention.

In general, the base station generates information about orthogonal Walsh codes assigned to a packet data service and transmits the orthogonal Walsh code information to a mobile station. The same is applied to the embodiment of the present invention. Referring to FIG. 1, an orthogonal WSI (Walsh Space Information) generator 101 outputs information about orthogonal Walsh codes assigned to the packet data service. A C/I acquirer 103 receives C/I information measured by the mobile station and C/I information for the case that the packet data service is provided according to power assigned to the packet data service. A data rate determiner 105 in the case of using orthogonal Walsh codes (referred to as a DR1 determiner 105) receives the output signals of the orthogonal WSI generator 101 and the C/I acquirer 103 and determines a transmission method and a data rate (DR1) by which the packet data service is provided using orthogonal Walsh codes.

A power reduction factor (K) calculator 109 calculates a power reduction factor K according to interference generated when QOF Walsh codes are used. The power reduction factor K can be empirically determined. In this case, the power reduction factor calculator 109 can be constituted of a memory for storing the empirical value of K principally as a function of Packet power to Overall power when using QOF Walsh codes and a device for reading the value from the memory. Alternatively, the power reduction factor K can be calculated by a predetermined equation or considering regional conditions. Then, the power reduction factor calculator 109 is correspondingly configured as a computing device. A data rate determiner 107 in the case of using QOF Walsh codes (referred to as a DR2determiner 107) receives the output signals of the C/I acquirer 103 and the power reduction factor K calculator 109 and determines a transmission method and a data rate (DR2) by which the packet data service is provided using QOF Walsh codes. A data rate selector 111 chooses a higher data rate of DR1 and DR2 and a transmission method corresponding to the chosen data rate. An information transmitter 113 outputs information about the chosen data rate and QOF Walsh code on or off information (QOF Walsh code usage state information) according to the output signal of the data rate selector 111.

Upon receipt of DR1 from the data rate selector 111, the information transmitter 113 outputs DR1 information and QOF Walsh code-off information. Upon receipt of DR2 from the data rate selector 111, the information transmitter 113 outputs DR2 information and QOF Walsh code-on information.

Figure 2:
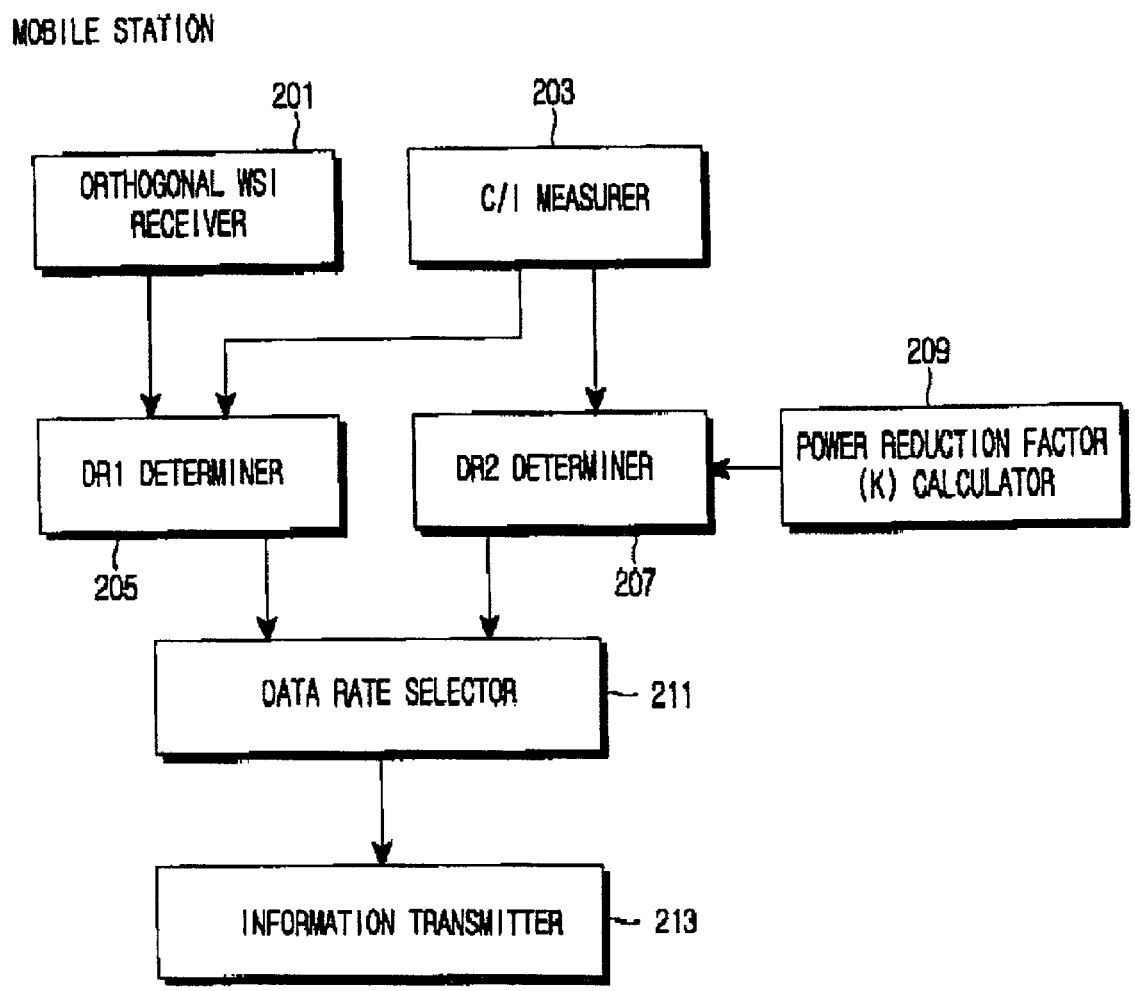
FIG. 2 is a block diagram of a mobile station for determining a data rate and a transmission method for a packet data service according to another preferred embodiment of the present invention.

FIG. 2 is a block diagram of a mobile station for determining a data rate and a transmission method for a packet data service according to another preferred embodiment of the present invention.

Referring to FIG. 2, an orthogonal WSI receiver 201 receives WSI from the base station at every predetermined time interval. A C/I measurer 203 measures the C/I of a received signal to which packet power was assigned considering forward radio channel state and packet power information. A DR1 determiner 205 receives the output signals of the orthogonal WSI receiver 201 and the C/I measurer 203 and determines a data transmission method and a data rate (DR1) in the case of providing the packet data service using orthogonal Walsh codes in the base station.

A power reduction factor (K) calculator 209 calculates the power reduction factor K according to interference generated when QOF Walsh codes are used. The power reduction factor K can be empirically determined. Alternatively, the power reduction factor K can be calculated by a predetermined equation or considering regional conditions. The power reduction factor calculator 209 can be implemented in the same manner as the power reduction factor calculator 109 shown in FIG. 1. A DR2 determiner 207 receives the output signals of the C/I measurer 203 and the power reduction factor K calculator 209 and determines a transmission method and a data rate (DR2) in the case of providing the packet data service using QOF Walsh codes in the base station. A data rate selector 211 chooses a higher data rate of DR1 and DR2 and a transmission method corresponding to the chosen data rate. An information transmitter 213 outputs information about the data rate and QOF Walsh code on or off information according to the output signal of the data rate selector 211.

Upon receipt of DR1 from the data rate selector 211, the information transmitter 213 outputs DR1 information and QOF Walsh code-off information. Upon receipt of DR2 from the data rate selector 211, the information transmitter 213 outputs DR2 information and QOF Walsh code-on information. The information transmitted from information transmitter 213 is received, for example, by a base station.

Figure 3:
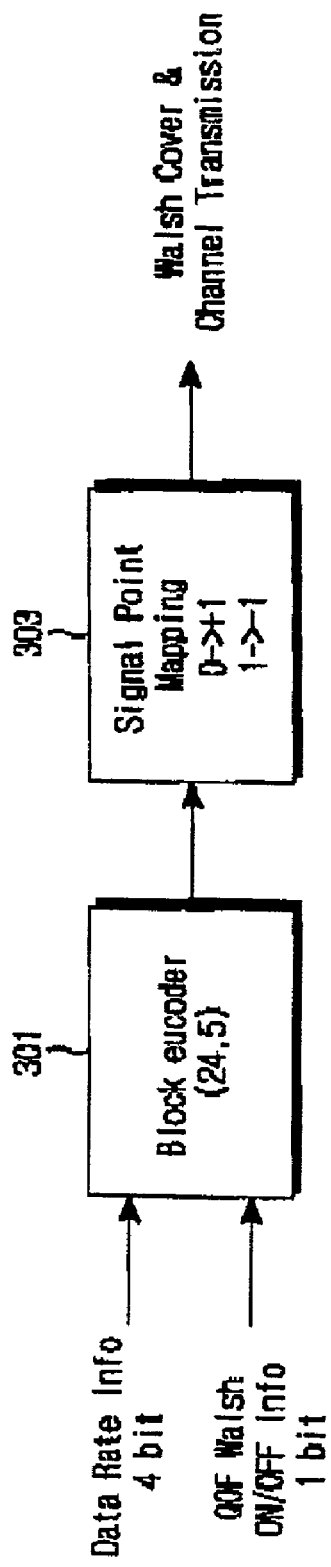
FIG. 3 is a block diagram of a transmitter for transmitting data rate information and QOF Walsh code on/off information output from an information transmitter shown in FIG. 1 or FIG. 2 to the other party according to the present invention.

FIG. 3 is a block diagram of a transmitter for transmitting the output of the information transmitter shown in FIG. 1 or 2 to the other party.

The information transmitter 113 or 213 feeds 4-bit data rate information and 1-bit QOF Walsh code on/off information to a (24, 5) block encoder 301. The block encoder 301 encodes the 5-bit information to 24 code symbols. A signal point mapper 303 maps 0s and 1s of the 24 code symbols to +1s and −1s, respectively. The output of the signal point mapper 303 is spread with a predetermined Walsh code prior to transmission.

Figure 4:
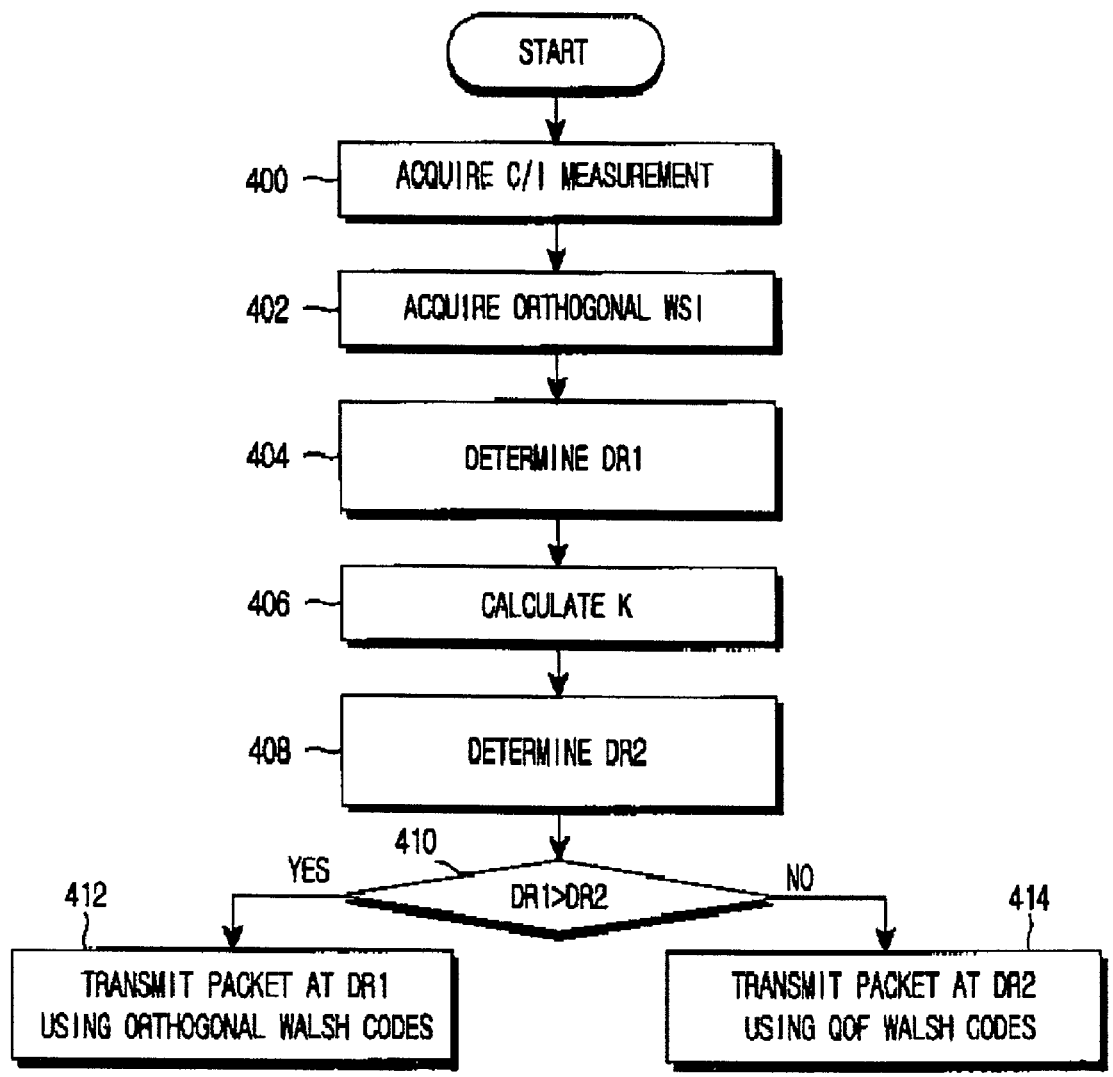
FIG. 4 is a flowchart illustrating an operation of determining whether to use orthogonal Walsh codes or QOF Walsh codes and transmitting packet data using the determined Walsh codes according to the present invention.

FIG. 4 is a flowchart illustrating an operation of determining whether to use orthogonal Walsh codes or QOF Walsh codes and transmitting packet data using chosen codes. The operation of FIG. 4 is implemented either in the base station of FIG. 1 or in the mobile station of FIG. 2. The following description is made in the context of the operation implemented in the base station.

As described above, the base station needs the C/I measurement of a signal to which packet power is assigned. Therefore, the C/I acquirer 103 receives the C/I measured by the mobile station on the reverse link in step 400. Here, a packet data rate varies with power assigned to the packet data service and the C/I measurement received from the mobile station. The orthogonal WSI generator 101 obtains orthogonal WSI representing orthogonal Walsh codes assigned for the packet data service in step 402. Steps 400 and 402 may occur concurrently in the structure of FIG. 1 or FIG. 2. In step 404, the DR1 determiner 105 determines a data rate info symbol representing a transmission method and a data rate as shown in Table 1 based on the C/I measurement of the packet signal and the orthogonal WSI. The power reduction factor calculator 109 calculates the power reduction factor K for the case of using QOF Walsh codes in step 406. In step 408, the DR2 determiner 107 determines a data rate info symbol representing a data rate and a transmission method for the case of using QOF Walsh codes. The QOF Walsh codes give (and receive) interference to (and from) orthogonal Walsh code users because they are actually quasi-orthogonal functions. Due to the resulting decrease of the C/I of a signal to which packet power is assigned, that is, power assigned to the packet data service, the power reduction factor K calculated in step 406 must be considered to use the QOF Walsh codes. Steps 404 to 408 may be performed at the same time in the structure of FIG. 1 or FIG. 2.

The power reduction factor K is determined in large part by a ratio of packet power involved in using QOF Walsh codes to circuit power involved in using orthogonal Walsh codes. If the base station uses all power for both the packet and circuit services and a ratio of packet power or circuit power to the overall power is known, information as shown in Table 2 can be achieved. Table 2 illustrates ratios of packet power to the overall power and power reduction factors K. These power reduction factors can be empirical values. Alternatively, they can be calculated by a predetermined formula or considering various factors influencing power.

TABLE 2

| Packet power/Overall power | Power reduction factor (K) |
| --- | --- |
| 0.8 | 0.9 |
| 0.7 | 0.8 |
| 0.6 | 0.7 |
| 0.5 | 0.6 |
| 0.4 | 0.5 |
| 0.3 | 0.5 |
| 0.2 | 0.5 |
| 0.1 | 0.5 |

Table 2 is a mere exemplary application and thus different reduction power factors K can be obtained. For better understanding of the present invention, data contained in Table 2 will be cited in the following description.

If the Packet power/Overall power ratio is 0.6 and K is 0.7, this implies that when the packet power assigned for packet data transmission is same for two cases, using QOF Walsh codes and using othorgonal Walsh codes, the effective transmitted power in using QOF Walsh codes is less than that of which is in using orthogonal Walsh codes by the factor of 0.7. The decrease of effective transmitted power is due to the interference between QOF Walsh codes and othorgonal Walsh codes. The number of QOF Walsh codes to be used is equal to that of all orthogonal Walsh codes. After obtaining the power reduction factor K for use of QOF Walsh codes, a data rate info symbol representing a data transmission method and a data rate is achieved based on the C/I of a signal to which packet power is assigned, the number of QOF Walsh codes, and the power reduction factor K, for example, using the technique described in the example below.

Returning to FIG. 4, the data rate selector 111 compares DR1 with DR2 in step 410. If DR1 is higher than DR2, the procedure goes to step 412 and otherwise, it goes to step 414.

In step 412, the information transmitter 113 transmits DR1 information and QOF Walsh code off information. Then, the base station transmits packet data at DR1 using available orthogonal Walsh codes. In step 414, the information transmitter 113 transmits DR2 information and QOF Walsh code on information. Then, the base station transmits packet data at DR2 using the QOF Walsh codes.

For example, if a data rate info symbol is "1100" in Table 1 and 32 orthogonal Walsh codes are generated from a 32-ary orthogonal Walsh function, basically four orthogonal Walsh codes are needed to provide a circuit call service. Therefore, 28 orthogonal Walsh codes are available to a circuit call service or a packet data service. When the circuit call service is not implemented and thus all orthogonal Walsh codes are assigned to the packet data service, uncoded 3072-bit packet data is transmitted in a single slot at a data rate of 2,457.6 kbps. If only seven orthogonal Walsh codes are available to the packet data service, four slots are needed to transmit the uncoded 3072-bit packet. Here, the real data rate is 614.4 Kbps (=3072/(4×1.25)msec). Shortage of orthogonal Walsh codes for code-division transmission of modulation symbols decreases the real data rate despite good radio channel state and enough power assigned to a packet. If QOF Walsh codes are used, all the modulation symbols can be transmitted in a single slot. Since the QOF Walsh codes are actually quasi-orthogonal, due consideration must be given to interference between orthogonal Walsh codes and the QOF Walsh codes. Since this interference leads to reduction of the transmission power in the base station, a data rate must be calculated based on a power reduction factor K to allow a packet to be received with intended quality at the mobile station when using QOF Walsh codes. For K=0.7, 1.4 (1/0.7) slots are needed in order to transmit a packet using QOF Walsh codes with the same energy as used for packet transmission in one slot using orthogonal Walsh codes. The 1.4 slots are equivalent to two slots considering that packet transmission is carried out on a slot basis. The real data rate is 1,228.8 kbps (=3072/(2×1.25 msec). When enough orthogonal Walsh codes are not available, the real data rate of packet data can be increased using QOF Walsh codes.

In accordance with the present invention as described above, a packet data service can be provided using QOF Walsh codes when insufficient orthogonal Walsh codes are available to the packet data service in a mobile communication system supporting concurrent transmission of high rate packet data and voice data. The present invention also advantageously prevents the decrease of a packet data rate caused by shortage of orthogonal Walsh codes and the resulting limited transmittable modulation symbols per unit time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A base station for providing a packet data service to a mobile station using at least one Walsh code of a plurality of quasi-orthogonal Walsh codes or a plurality of orthogonal Walsh codes to increase a data rate in a mobile communication system where the base station assigns the plurality of orthogonal Walsh codes to the mobile station, comprising:

an orthogonal Walsh code space information(WSI) generator for generating information about the orthogonal Walsh codes for the packet data service;

a carrier-to-interference (C/I) acquirer for receiving C/I information from the mobile station;

a first determiner for receiving the orthogonal Walsh code information and the C/I information from the orthogonal Walsh code space information generator and the C/I acquirer and determining a first data rate of the case that use the orthogonal Walsh codes;

a second determiner for receiving the C/I information from the C/I acquirer and determining a second data rate of the case that use the quasi-orthogonal Walsh codes; and a data rate selector for selecting a higher data rate of the first data rate and the second data rate.

2. The base station of claim 1, further comprising a power reduction factor calculator for calculating a power reduction factor by which transmission power is decreased when using the quasi-orthogonal Walsh codes and outputting the power reduction factor to the second determiner to determine the second data rate.

3. The base station of claim 1, further comprising an information transmitter for generating information about the data rate selected by the data rate selector and quasi-orthogonal Walsh code usage state information that indicates whether the quasi-orthogonal Walsh codes are used or not and transmitting the generated information to the mobile station.

4. The base station of claim 3, further comprising a block encoder for encoding the data rate information and the quasi-orthogonal Walsh code usage state information from the information transmitter, and a signal point mapper for mapping the output of the block encoder.

5. A mobile station for determining a data rate for a packet data service using at least one Walsh code of a plurality of orthogonal Walsh codes or a plurality of quasi-orthogonal Walsh codes to increase a data rate in a mobile communication system where the base station assigns the plurality of orthogonal Walsh codes to the mobile station, comprising:
   an orthogonal Walsh code space information(WSI) receiver for receiving information about the orthogonal Walsh codes for the packet data service;
   a C/I measurer for measuring the C/I of a packet signal received from the base station;
   a first determiner for receiving the orthogonal Walsh code information and the C/I information from the orthogonal Walsh code space information receiver and the C/I measurer and determining a first data rate of the case that use the orthogonal Walsh codes;
   a second determiner for receiving the C/I information from the C/I measurer and determining a second data rate of the case that use the quasi-orthogonal Walsh codes; and
   a data rate selector for selecting a higher data rate of the first data rate and the second data rate.

6. The mobile station of claim 5, further comprising a power reduction factor calculator for calculating a power reduction factor by which transmission power is decreased when using the quasi-orthogonal Walsh codes and outputting the power reduction factor to the second determiner to determine the second data rate.

7. The mobile station of claim 5, further comprising an information transmitter for generating information about the data rate selected by the data rate selector and quasi-orthogonal Walsh code usage state information that indicates whether the quasi-orthogonal Walsh codes are used or not, and transmitting the generated information to the base station.

8. The mobile station of claim 7, further comprising a block encoder for encoding the data rate information and the quasi-orthogonal Walsh code usage state information from the information transmitter, and a signal point mapper for mapping the output of the block encoder.

9. A method for a base station of providing a packet data service to a mobile station using at least one Walsh code of a plurality of quasi-orthogonal Walsh codes or a plurality of orthogonal Walsh codes to increase a data rate in a mobile communication system where the base station assigns the plurality of orthogonal Walsh codes to the mobile station, comprising the steps of:
   generating information about the orthogonal Walsh codes for the packet data service;
   receiving C/I information from the mobile station;
   determining a first data rate in the case of using the orthogonal Walsh codes based on the orthogonal Walsh code information and the C/I information;
   determining a second data rate in the ease of using the quasi-orthogonal Walsh codes based on the C/I information; and
   selecting a higher data rate of the first data rate and the second data rate.

10. The method for determining the second data rate of claim 9, further comprising the step of calculating a power reduction factor by which transmission power is decreased when using the quasi-orthogonal Walsh codes and determining the second data rate based on the C/I information and the power reduction factor.

11. The method of claim 9, further comprising the step of generating information about the selected data rate and quasi-orthogonal Walsh code usage state information that indicates whether the quasi-orthogonal Walsh codes are used or not and transmitting the generated information to the mobile station.

12. A method of determining a data rate for a packet data service in a mobile station using at least one Walsh code of a plurality of quasi-orthogonal Walsh codes or a plurality of orthogonal Walsh codes to increase a data rate in a mobile communication systems where a base station assigns the plurality of orthogonal Walsh codesto the mobile station, comprising the steps of:
   receiving information about the orthogonal Walsh codes for the packet data service;
   measuring the C/I of a packet signal received from the base station;
   determining a first data rate in the case of using the orthogonal Walsh codes based on the orthogonal Walsh code information and the C/I information;
   determining a second data rate in the case of using the quasi-orthogonal Walsh codes based on the C/I information; and
   selecting a higher data rate of the first data rate and the second data rate.

13. The method for determining the second data rate of claim 12, further comprising the step of calculating a power reduction factor by which transmission power is decreased when using the quasi-orthogonal Walsh codes and determining the second data rate based on the C/I information and the power reduction factor.

14. The method of claim 12, further comprising the step of generating information about the selected data rate and quasi-orthogonal Walsh code usage state information that indicates whether the quasi-orthogonal Walsh codes are used or not, and transmitting the generated information to the base station.

* * * * *